United States Patent Office 3,207,665
Patented Sept. 21, 1965

3,207,665
HEPARIN DERIVATIVES AND METHODS OF MAKING SAME
Robert Bucourt, Clichy-sous-Bois, Seine-et-Oise, France, assignor to Roussel-UCLAF, Paris, France, a corporation of France
No Drawing. Filed Jan. 16, 1964, Ser. No. 338,027
Claims priority, application France, Jan. 21, 1963, 922,050
11 Claims. (Cl. 167—74)

The invention relates to the novel compound, N-benzyl heparinamide and its alkali metal salts and to a novel process for its preparation. The invention further relates to novel anticoagulant compositions having an elevated antilipemic and clarifying activity and to a novel method of retarding the coagulation of blood.

It is an object of the invention to provide the novel compound, N-benzyl heparinamide, and its alkali metal salts.

It is another object of the invention to provide a novel process for the preparation of N-benzyl heparinamide and its alkali metal salts.

It is a further object of the invention to provide novel anticoagulant compositions having an elevated antilipemic and clarifying activity.

It is an additional object of the invention to provide a novel method of retarding the coagulation of blood.

These and other objects and advantages of the invention will become obvious from the following detailed description.

The novel products of the invention are N-benzyl heparinamide and its alkali metal salts which have the probable following structural formula

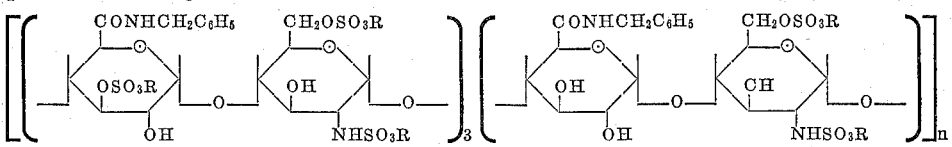

wherein R is selected from the group consisting of hydrogen and an alkali metal.

Derivatives of heparine having coagulating retarding activity are known. However, N-benzyl heparinamide and its alkali metal salts not only possess a prolonged anticoagulating activity, marked even at relatively small doses, but also possess an elevated antilipemic and clarifying activity.

The process of the invention for the preparation of an alkali metal salt of N-benzyl heparinamide comprises reacting a lower alkyl chloroformate with a high molecular weight long chain quaternary ammonium salt of heparine to form a mixed anhydride and reacting the latter with mono benzylamine to form the corresponding quaternary ammonium salt of N-benzyl heparinamide which may be reacted with an alkali metal salt of a lower alkanoic acid to form the corresponding alkali metal salt of N-benzyl heparinamide.

The process for the preparation of N-benzyl heparinamide comprises reacting a lower alkyl chloroformate with a high molecular weight long chain quaternary ammonium salt of heparin to form the corresponding mixed anhydride and reacting the latter with monobenzylamine to form the corresponding quaternary ammonium salt of N-benzyl heparinamide which is reacted with an alkali metal salt of a lower alkanoic acid to form the corresponding alkali metal salt of N-benzyl heparinamide, the aqueous solution of which is treated by an acid ion exchange resin to form N-benzyl heparinamide.

The high molecular weight long chain quaternary ammonium compounds used to form the corresponding salt of heparine are such as for example benzyldimethyl-2-[2-(p-1,1,3,3-tetramethyl-butyl-phenoxy)-ethoxy]-ethyl ammonium chloride which is also known under the trademark "Hyamine 1622," trimethyl-(methyldodecylbenzyl)-ammonium chloride, dilauryldimethyl ammonium chloride and other suitable compounds.

A preferred mode of the process of the invention comprises reacting ethyl chloroformate with a high molecular weight long chain quaternary ammonium salt of heparine in the presence of an inert solvent such as tetrahydrofuran to form the corresponding mixed anhydride, reacting the latter with monobenzylamine at temperatures about 0° C. to form the corresponding quaternary ammonium salt of N-benzyl heparinamide which is at least 90% amidified and treating the latter with an aqueous solution of sodium acetate to form the sodium salt of N-benzyl heparinamide which may be precipitated by the addition of a lower alkanol such as methanol. Other alkali metal salts of lower alkanoic acids may be used in place of sodium acetate.

As has been indicated above N-benzyl heparinamide and its alkali metal salts are useful for the treatment or the prevention of thrombosis, which can come on unexpectedly in circulatory illnesses, phlebitis, arteritis, as well as in cardiac illnesses.

These compounds possess particularly the advantage over heparine of exercising a prolonged action which avoids repeated intravenous injections or continuous venous perfusions corresponding to very elevated doses of heparine. They possess, in addition, the advantage over the anticoagulant derivatives of dicoumarine of acting with rapidity and during an easily determinable delay, whereas the derivatives of dicoumarine which inhibit the synthesis of thrombine in the liver (antagonists of vitamin K) have a delaying action but whose duration cannot be foreseen with certainty. Finally, for aught we know the action of N-benzyl heparinamide and of its alkali metal salts is manifest on all stages of coagulation. This renders its action more sure and less dangerous for the organism.

The products of the invention can be employed in general under all conditions of use of heparine with the advantage of a decrease in frequency of the injections.

The novel anticoagulant compositions of the invention having an elevated antilipemic and clarifying activity are comprised of a compound selected from the group consisting of N-benzyl heparinamide and its alkali metal salts and a major amount of a pharmaceutical carrier. The compositions may be in the form of aqueous injectable solutions and suppositories prepared in the usual manner.

The novel method of the invention of retarding the coagulation of blood comprises administering an effective amount of a compound selected from the group consisting of N-benzyl heparinamide and its alkali metal salts. The said compounds may be administered rectally or transcutaneously in the form of intramuscular, subcutaneous or intravenous injections. The usual useful dosage is between 100 and 600 mg. per day depending upon the method of administration.

In the following example there are described several preferred embodiments to illustrate the invention. However, it should be understood that the invention is not intended to be limited to the specific embodiments.

EXAMPLE I

Preparation of the sodium salt of N-benzyl heparinamide 100 cc. of tetrahydrofuran and 10 gm. of the neutral Hyamine 1622 salt of heparine (prepared according to U.S. Patent No. 2,989,438) were introduced into a three-necked balloon flask and the mixture was agitated until total dissolution occurred. Then, the mixture was cooled to 0° and 3.3 cc. of ethyl chloroformate were added. Agitation was continued and then 25 cc. of monobenzyl-amine were added. A precipitate of N-benzyl heparin-amide occurred and the reaction mixture was held overnight in a refrigerator. Thereafter the reaction mixture was evaporated under vacuum and the residue was taken up in 100 cc. of butanol. The butanolic solution was extracted several times with an aqueous solution containing 20% of sodium acetate. The sodium salt of N-benzyl heparinamide was precipitated from methanol and the precipitate was vacuum filtered and washed with methanol. Thereafter the precipitate was taken up in distilled water and 300 cc. of a solution of Hyamine 1622 were added thereto. The Hyamine salt precipitated and the salt was separated, washed with distilled water and dried under vacuum. The benzyl heparinamide was isolated thus in the form of its Hyamine 1622 salt and weighed 9.5 gm.

One proceeds to a second amidification on the 9.5 gm. of product obtained above under the same conditions as that preceding. There was finally obtained 2.7 gm. of benzyl heparinamide in the form of its sodium salt which had an amidification value of 93%.

The sodium salt of N-benzyl heparinamide occurred in the form of an amorphous white powder and was very soluble in water, soluble in dilute aqueous acids and dilute aqueous alkalis and insoluble in alcohol, ether, acetone, benzene and chloroform. Its specific rotation was $[\alpha]_D^{20} = +69.8°$ (c.=1% in water).

Ultraviolet absorption corresponding to $1.3 \times 10^{-3}$ benzyl groups per ram (theoretical: 1,4).

U./mg.
Anticoagulant activity in vitro _____ 28
Antilipemic activity in vitro _____ 145

Analysis of the sodium salt of benzyl heparinamide, raw formula $$[C_{76}H_{93}O_{69}N_8S_{11}Na_{11}]_n$$

molecular weight=$(2,828.30)_n$.

Calculated: C, 32.27; H, 3.31%; N, 3.95; ash 27.60.
Found: C, 32.7, 32.9; H, 3.8, 3.9; N, 3.8, 3.8; ash, 26.85.

This compound is not described in the literature.

PHARMACOLOGICAL STUDY OF N-BENZYL HEPARINAMIDE AND ITS ALKALI METAL SALTS

(1) Immediate anticoagulant activity in vitro

A plasma reactant deprived of calcium and prothombine was prepared. By adding thrombine to this plasma, the fibrinogen which it contains was transformed into fibrin which produced simultaneously a coagulation and an opacification. The previous addition of an anticoagulant such as heparine provokes a retardation of the coagulation and of the opacification. If the time necessary to obtain a given value of opacity is measured, it can be observed that there exists a relation between this time and the coagulating activity of the preparation. The values obtained are hereafter reported as those found compared to a solution of control heparine. The values are expressed in antithrombic units (U.A.T.).

RESULTS

U.A.T./mg.
Heparine control (sodium salt) _____ 130–140
The sodium salt of N-benzyl heparinamide ___ 25–28

(2) Prolonged anticoagulating action in vivo by intravenous method

This action was studied in the rabbit by determining the time of coagulation at regular intrevals (2, 4, 6, 8 and 10 hours after intravenous injection of the compound studied). The compounds were administered at doses of 10 mg./kg. and 20 mg./kg. The following results have been obtained:

TABLE I

| Compound administered | Anticoagulant activity | | | |
| --- | --- | --- | --- | --- |
| | 10 mg./kg. | | 20 mg./kg. | |
| | Number of U./kg. | Duration of action, hours | Number of U./kg. | Duration of action, hours |
| Heparine (sodium salt) | 1,300 | 4 | 2,600 | 6–7 |
| The sodium salt of N-benzyl heparinamide | 250 | 3–4 | 500 | 7–8 |

As can be seen from this table, the sodium salt of N-benzyl heparinamide possesses a prolonged anticoagulant action at anticoagulant doses (expressed in units) infinitely lower than those of heparine necessary to obtain an effect of the same order.

(3) Clarifying activity in vitro

The clarifying activity of the sodium salt of N-benzyl heparinamide was determined by utilizing the technique published by Plotka and Jequier (Arch. Int. Pharmacodyn., 1960, 126, 140). After having verified on several samples of heparine that the variations of anticoagulant and antilipemic values were always parallel, a heparine testing 150 anticoagulant units per mg. was taken as a reference standard and was given the arbitrary value of 150 clarifying or antilipemic units which was used to define the antilipemic activity of the sodium salt of N-benzyl heparinamide in antilipemic units. To this effect, the variations of turbidity caused by the action of increasing doses of standard heparine were measured in the presence of $CaCl_2$ on the same volume of artificial substrate of egg yellow. In certain limits of concentration of heparine, the graphic representation was a straight line. The test was repeated with the sodium salt of N-benzyl heparinamide and, with reference to the reference graph, the value in antilipemic units (A.L.) of the sample was found to be 145 U./mg.

(4) Determination of toxicity

The sodium salt of N-benzyl heparinamide was placed in solution in physiological serum and administered to lots of ten mice of the Rockland strain weighing between 18 and 22 gm. The compound was injected intravenously in a volume of 10 cc. per kg. of animal at doses, respectively, of 100 mg./kg. and 200 mg./kg. The animals held under observation for a period of one week manifested no sign of intoxication. There was no mortality observed at a dose of 200 mg/kg. Therefore, the sodium salt of N-benzyl heparinamide in acute testing on mice at a dose of 200 mg. /kg. administered intravenously is devoid of toxicity.

Various modifications of the compositions and process of the invention may be made without departing from the spirit or scope thereof, and it is to be understood that the invention is to be limited only as defined in the appended claims.

I claim:
1. A compound selected from the group consisting of N-benzyl heparinamide and its alkali metal salts.
2. N-benzyl heparinamide.
3. The sodium salt of N-benzyl heparinamide.
4. A process for the preparation of an alkali metal salt of N-benzyl heparinamide which comprises reacting a lower alkyl chloroformate with a high molecular weight quaternary ammonium salt of heparine to form the corresponding mixed anhydride and reacting the latter with monobenzylamine to form the corresponding quaternary ammonium salt of N-benzyl heparinamide which is re- acted with an alkali metal salt of a lower alkanoic acid to form the corresponding alkali metal salt of N-benzyl heparinamide.

5. The process of claim 4 wherein the said alkali metal salt of a lower alkanoic acid is sodium acetate.

6. The process of claim 4 wherein the lower alkyl chloroformate is ethyl chloroformate.

7. A process for the preparation of the sodium salt of N-benzyl heparinamide which comprises reacting ethyl chloroformate with a high molecular weight quaternary ammonium salt of heparine in the presence of an inert organic solvent to form a mixed anhydride, reacting the latter with monobenzylamine to form the corresponding quaternary ammonium salt of N-benzyl heparinamide and reacting the latter with an aqueous solution of sodium acetate to form the sodium salt of N-benzyl heparinamide.

8. A process for the preparation of N-benzyl heparinamide, which comprises reacting a lower alkyl chloroformate with a high molecular weight quaternary ammonium salt of heparine to form the corresponding mixed anhydride and reacting the latter with monobenzylamine to form the corresponding quaternary ammonium salt of N-benzyl heparinamide which is reacted with an alkali metal salt of a lower alkanoic acid to form the corresponding alkali metal salt of N-benzyl heparinamide, the aqueous solution of which is treated by an acid ion exchange resin to form N-benzyl heparinamide.

9. An anticoagulant composition comprising a compound selected from the group consisting of N-benzyl heparinamide and its alkali metal salts and a major amount of a pharmaceutical carrier.

10. The composition of claim 9 containing 100 to 600 mg. of the anticoagulating compound.

11. The composition of claim 9 wherein the anticoagulating compound is the sodium salt of N-benzyl heparinamide.

No references cited.

JULIAN S. LEVITT, *Primary Examiner.*